United States Patent [19]

Inada et al.

[11] Patent Number: 4,501,298

[45] Date of Patent: Feb. 26, 1985

[54] SOLENOID ACTUATED VALVE DEVICE

[75] Inventors: Masami Inada, Kariya; Kenji Hashimoto, Toyota, both of Japan

[73] Assignee: Aisin Seiki Kabushiki Kaisha, Kariya, Japan

[21] Appl. No.: 413,604

[22] Filed: Sep. 1, 1982

[30] Foreign Application Priority Data

Sep. 11, 1981 [JP] Japan ............................... 56-144109

[51] Int. Cl.³ ...................... F16K 11/07; F16K 31/08
[52] U.S. Cl. ............................. 137/625.48; 251/129; 251/65
[58] Field of Search ..................... 137/625.48, 625.65; 251/129, 65

[56] References Cited

U.S. PATENT DOCUMENTS 4,216,938 8/1980 Inada et al. .......................... 251/65
4,294,286 10/1981 Inada et al. ....................... 251/65 X Primary Examiner—Arnold Rosenthal
Attorney, Agent, or Firm—Finnegan, Henderson, Farabow, Garrett and Dunner

[57] ABSTRACT

A solenoid actuated valve device for controlling the flow of fluid comprising a body having an inlet port, a first outlet port, a second outlet port, and a bore for fluid communication with the inlet and first outlet ports at one end thereof and for fluid communication with the second outlet port at the other end thereof. A magnetic hollow tubular core is axially mounted within the bore for dividing the bore into an annular outer chamber, a first inner chamber and a second inner chamber communicating among the inlet port, first outlet port and second outlet port, respectively, and the core has first and second apertures for fluid communication between the outer chamber and first and second inner chambers, respectively. A non-magnetic bobbin, having a valve and at least two radially outwardly extending and circumferentially spacing projections, is slidably mounted on an outer periphery of the core to control the effective open areas of the first and second apertures, the projections defining a first series of fluid passages therebetween for decreasing the dynamic fluid pressure axially acting thereon. Springs are seated at one end thereof against the projections of the bobbin for biasing the bobbin to a position wherein the valve closes the first aperture and opens the second aperture. A solenoid coil is wound on said bobbin, and permanent magnets are secured in the body so that the magnetic flux thereof intersects the winding of the solenoid coil at right angles thereto. An electromagnet defines a magnetic circuit with the core and the permanent magnets to provide a magnetic force causing the bobbin to move axially against the springs when electric current passes through the solenoid coil.

4 Claims, 3 Drawing Figures

SOLENOID ACTUATED VALVE DEVICE

BACKGROUND OF THE INVENTION

1. Field of the Invention

The present invention relates to a solenoid actuated valve device and more particularly to a solenoid actuated valve device for controlling the flow of fluid in proportion to the electric current energizing the solenoid.

2. Description of the Prior Art

A conventional solenoid actuated valve device is comprised of a linear motor of the movable coil type, a valve means and spring means normally biasing the valve means to an inoperative position. The linear motor includes a magnetic core, a non-magnetic bobbin slidably mounted on the core, a solenoid coil wound on the bobbin, permanent magnets mounted adjacent the solenoid coil so that the magnetic flux of each magnet intersects the winding of the solenoid coil at right angles thereto and a magnetic yoke or body forming a magnetic circuit with the core. The valve means in general includes at least one sliding valve member which slides with the bobbin on the core against the biasing force of the spring means in response to an electric current flowing through the solenoid coil. Movement of the valve member proportionally controls the opening and closing of at least one aperture formed in the core between inlet and outlet ports positioned at opposite ends of the body, respectively.

The U.S. Patent to Ohumi, No. 4,294,286 granted on Oct. 13, 1981 and U.S. patent application Ser. No. 156,162 filed on June 3, 1980 in the name of Ohumi et al are examples of such solenoid actuated valve devices.

In such prior solenoid actuated valve devices, the spring means is seated against a radially outwardly extending annular flange of the bobbin. Such annular flange in the device shown in the U.S. Pat. No. 4,294,286 acts as an obstacle to the flow of fluid between the inlet and outlet ports, thereby causing the inaccurate sliding movement of the sliding valve due to the axial thrust force exerted on the annular flange by striking of the fluid flow thereto.

Such inaccurate sliding movement of the sliding valve is avoided in the latter discussed prior art device of Ser. No. 156,162 because the body is provided with axially extending bypass passages in the peripheral wall thereof for decreasing the axial thrust force acting on the annular flange to an extent wherein the sliding valve receives no substantial urging force from the fluid flow. However, the arrangement of bypass passages in the peripheral wall of the body increases the diameter of the body.

Accordingly, it is an object of the present invention to provide a new and improved solenoid actuated valve device which obviates the above-mentioned drawbacks of prior art solenoid actuated valve devices.

More particularly, it is an object of the present invention to provide a new and improved solenoid actuated valve device wherein the axial thrust force acting on the internal components of the device is decreased without increasing the diameter of the body so that no substantial biasing force is exerted by the fluid flow on those internal components.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the purpose of the invention, as embodied and broadly described herein, the solenoid actuated valve device of this invention comprises a body having an inlet port, at least one outlet port and a bore communicating with the ports at the opposite ends thereof, respectively. A magnetic hollow tubular core is axially mounted within the body for dividing the bore into an annular outer chamber and at least one inner chamber communicating with the outlet and inlet ports, the core having at least one radially extending aperture therethrough for fluid communication between said chambers.

A non-magnetic bobbin, having valve means and at least two radially outwardly extending and circumferentially spacing projections, is slidably mounted on an outer periphery of the core to control the effective open area of the aperture, the projections defining a first series of fluid passages therebetween for decreasing the dynamic fluid pressure axially acting thereon. Spring means are seated at one end thereof against the projections of the bobbin for biasing the bobbin, and a solenoid coil is wound on the bobbin. Permanent magnetic means are secured in the body so that the magnetic flux thereof intersects the winding of the solenoid coil at right angles thereto. Electromagnetic means define a magnetic circuit with the core and the permanent magnetic means to provide a magnetic force causing the bobbin to move axially against the spring means when electric current passes through the solenoid coil.

Preferably, the electromagnetic means includes a magnetic yoke and an annular member for supporting the yoke in the body, the annular member having radially outwardly extending and circumferentially spaced projections thereon. The projections define a second series of fluid passages for guiding the flow of fluid from the inlet port into the first series of passages.

It is also preferred that the first series of passages include a plurality of individual openings, and the second series of passages includes a plurality of corresponding openings each axially aligned with one of the individual openings.

BRIEF DESCRIPTION OF THE DRAWINGS

The accompanying drawings, which are incorporated in and constitute a part of this specification, illustrate one embodiment of the invention and, together with the description, serve to explain the principles of the invention.

Of the drawings.

DETAILED DESCRIPTION OF THE PREFERRED EMBODIMENT

Reference will now be made in detail to the present preferred embodiment of the invention, an example of which is illustrated in the accompanying drawings.

In accordance with the invention, the solenoid actuated valve device comprises a body having an inlet port, at least one outlet port and a bore communicating with the ports at the opposite ends thereof.

Figure 1:
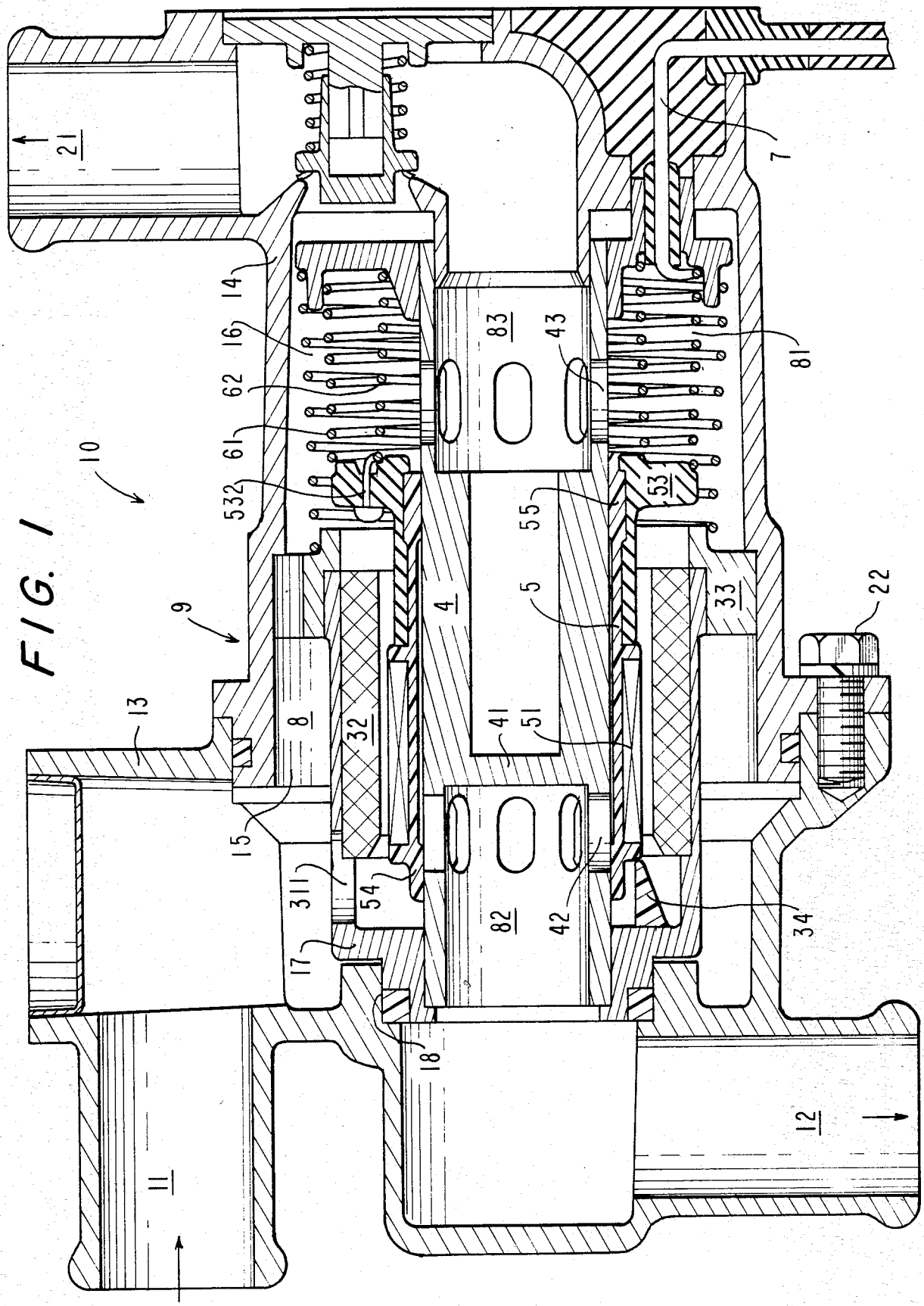
FIG. 1 is a sectional view of a solenoid actuated valve device according to the present invention.

As here embodied and as shown in FIG. 1, a solenoid actuated valve device 10 comprises a body 9 including a first body portion 13 made of a suitable non-magnetic material, having inlet and outlet ports 11 and 12 respectively. The body 9 also includes a second body portion 14, made of a suitable non-magnetic material, having an outlet port 21. The body portions 13 and 14 are sealingly connected by bolts 22 to thereby define a bore 8 within body 9 which communicates at left end portion 15 thereof with ports 11 and 12 and communicates at right end portion 16 thereof with port 21.

In accordance with the invention, a magnetic hollow tubular core is axially mounted within the body for dividing the bore into an annular outer chamber and at least one inner chamber communicating with the outlet and inlet ports, the core having at least one radially extending aperture therethrough for fluid communication between the chambers.

As embodied herein, a hollow tubular core 4, made of a suitable magnetic material such as steel, having a divider wall 41 therein is axially positioned within bore 8 to thereby divide bore 8 into an annular outer chamber 81 and two inner chambers 82 and 83. Chambers 81, 82 and 83 are in communication with ports 11, 12 and 21, respectively.

Figure 3:
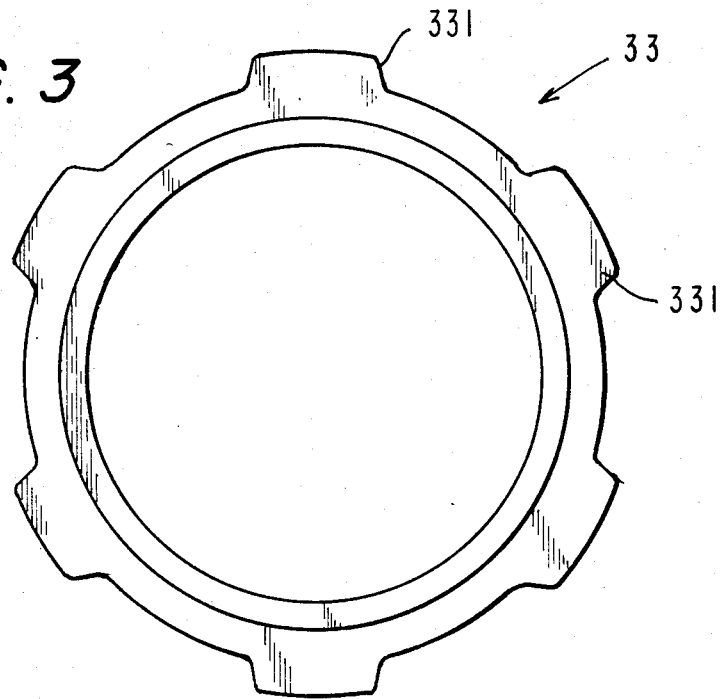
FIG. 3 is a side view of a supporter for supporting a yoke shown in FIG. 1.

In accordance with the invention, a non-magnetic bobbin, having valve means and at least two radially outwardly extending and circumferentially spacing projections is slidably mounted on an outer periphery of the core to control the effective open area of the aperture, the projections defining a first series of fluid passages therebetween for decreasing the dynamic fluid pressure axially acting thereon. Spring means are seated at one end thereof against the projections of the bobbin for biasing the bobbin. A solenoid coil is wound on the bobbin, and permanent magnetic means are secured in the body so that the magnetic flux thereof intersects the winding of the solenoid coil at right angles thereto. As embodied herein, a bobbin 5 made of suitable non-magnetic material such as synthetic resin or the like is slidably mounted on an outer periphery of core 4. A solenoid coil 51 is wound on the bobbin 5. A pair of permanent magnets 32 are secured to a yoke 17 of magnetic material. A left end of yoke 17 is supported by an annular supporting portion 18 of body portion 13 and this end supports a left end of core 4. A right end of yoke 17 is supported by an annular supporting member 33 which is supported by body portion 14 and is provided at the outer periphery thereof with a plurality of radially outwardly extending projections 331, clearly shown in FIG. 3, defining a first series of fluid passages therebetween for passing through the flow of fluid between inlet and outlet ports 11 and 21. A plurality of openings or apertures 311 are formed in yoke 17 for passing through the flow of fluid between inlet and outlet ports 11 and 12. A pair of permanent magnets 32 are so positioned that the magnet flux of each of magnets 32 intersects the winding of coil 51 at right angles thereto.

In accordance with the invention, electromagnetic means defining a magnetic circuit with the core and the permanent magnetic means provide a magnetic force causing the bobbin to move axially against the spring means when electric current passes through the solenoid coil. As embodied herein, a magnetic circuit for the magnets 32 is formed by means of core 4 and yoke 17 thereby defining a linear motor 50 of the movable coil type. Sliding valves 54 and 55 having an annular sleeve connfiguration are formed so that valves 54 and 55 are normally maintained in the illustrated positions wherein the left end of valve 54 abuts with resilient stopper 34 fixed to yoke 17, and apertures 42 and 43 are respectively fully closed and opened. The left ends of springs 61 and 62 (as oriented in FIG. 1) are connected to opposite ends of coil 51, while the right ends of springs 61 and 62 are connected to a suitable power supply by means of lead wires 7, only one of which is shown in FIG. 1. Thus, springs 61 and 62 also function as electrically conductive members. In order to prevent springs 61 and 62 from forming a short circuit therebetween, an electrical insulating member such as fluorine resin may be coated on the springs 61 and 62.

Figure 2:
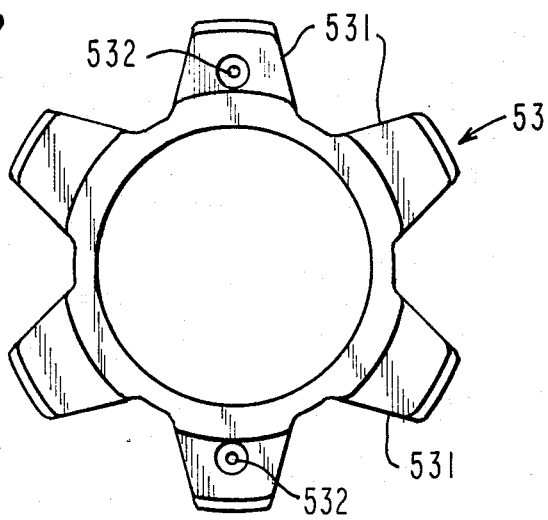
FIG. 2 is a side view of spring holders of a bobbin shown in FIG. 1.

According to the present invention, spring holder 53 is provided with a plurality of radially outwardly extending and circumferentially spacing projections 531, as clearly shown in FIG. 2, for receiving springs 61 and 62. These projections 531 define fluid passages therebetween to decrease the axial thrust force axially acting on projections 531. This force results from the striking of the fluid flow against the holder 53 during the flowing of the fluid between inlet and outlet ports 11 and 12. Therefore, spring holder 53, namely valves 54, 55 will receive no substantial biasing force by dynamic pressure and the valves 54, 55 may not be operated inaccurately. The number of projections 531 of spring holder 53 is preferably the same as that of projections 331 of supporting member 33, and projections 531 and 331 are in axial alignment to thereby provide a flow guiding function with the supporting member 33 for decreasing the amount of fluid flow hitting projections 531. A pair of axial hollow projections 532 are formed on projections 531 for securing the left ends of springs 61 and 62 in a radial direction and for electrical connection between both ends of coil 51 and springs 61 and 62.

The operation of solenoid actuated valve device 10 will now be set forth in detail. Under normal or non-operating conditions where no electric current flows through solenoid coil 51, bobbin 5 with valves 54 and 55 is maintained in its illustrated position by springs 61 and 62 whereby apertures 42 are closed by valve 54 while apertures 43 are open. Under this condition, the fluid communication between inlet port 11 and outlet port 12 is interrupted while the fluid communication between inlet port 11 and outlet port 21 is established. This allows flow of fluid supplied into inlet 11 from a source (not shown) to outlet 21 through an annular passage surrounding yoke 17, the first series of passages between projections 331 of member 33, the second series of passages surrounding spring holder 53, apertures 43 and chamber 83. The magnetic flux of the magnets 32 forms a closed loop through core 4, yoke 17 and coil 51.

When an electric current flows through coil 51, an electromagnet force is generated in proportion to the electric current to thereby move bobbin 5, with coil 51 and valves 54 and 55 thereon to the right against the biasing forces of springs 61 and 62 as viewed in FIG. 1. Accordingly, apertures 42 are opened to an extent determined by movement of bobbin 5, and thus the effective open area of apertures 42 is increased in proportion to the righthand movement of bobbin 5. Simultaneously, apertures 43 are closed to an extent determined by movement of bobbin 5 and thus the effective open area of apertures 43 is decreased in proportion to the righthand movement of bobbin 5. Therefore, the fluid supplied to inlet port 11 will be delivered to both of outlet ports 12 and 21 in proportion to the ratio between effective open areas of apertures 42 and 43.

Solenoid actuated valve device 10 may be used in an exhaust gas cleaning system of an automotive vehicle wherein inlet port 11, outlet port 12 and outlet port 21 are connected to an air pump, an exhaust pipe, and an air cleaner, respectively. In this case, coil 51 is connected to a computer for controlling the electric current to be supplied through the coil in response to engine temperature, engine revolutions, and engine vacuum, etc. to thereby constitute a secondary air supply system.

Obviously, many modifications and variations of the present invention are possible in light of the above. It is, therefore, to be understood that within the scope of the appended claims, the invention may be practicable otherwise than as specifically described herein.

What is claimed is:

1. A solenoid actuated valve device for controlling the flow of fluid comprising:
    a body having an inlet port, at least one outlet port and a bore communicating with said ports at the opposite ends thereof, respectively,
    a magnetic hollow tubular core axially mounted within said body for dividing said bore into an annular outer chamber and at least one inner chamber communicating with said outlet and inlet ports, said core having at least one radially extending aperture therethrough for fluid communication between said chambers,
    a non-magnetic bobbin, having valve means and at least two radially outwardly extending and circumferentially spaced projections, slidably mounted on an outer periphery of said core to control the effective open area of said aperture, said projections defining a first series of fluid passages therebetween for decreasing the dynamic fluid pressure axially acting thereon,
    spring means seated at one end thereof against said projections of said bobbin for biasing said bobbin,
    a solenoid coil wound on said bobbin,
    permanent magnetic means secured in said body so that the magnetic flux thereof intersects the winding of said solenoid coil at right angles thereto, and
    electromagnetic means defining a magnetic circuit with said core and said permanent magnetic means to provide a magnetic force causing said bobbin to move axially against said spring means when electric current passes through said solenoid coil, said electromagnetic means including a magnetic yoke and an annular member for supporting said yoke in said body, said annular member having radially outwardly extending and circumferentially spaced projections defining a second series of fluid passages for guiding the flow of fluid from said inlet port into said first series of passages between said projections of said bobbin.

2. A solenoid actuated valve device as set forth in claim 1, wherein said first series of passages includes a plurality of individual openings, and said second series of passages includes a plurality of corresponding openings each axially aligned with one of said individual openings.

3. A solenoid actuated valve device for controlling the flow of fluid comprisng:
    a body having an inlet port, a first outlet port, a second outlet port, and a bore for fluid communication with said inlet and first outlet ports at one end thereof and for fluid communication with said second outlet port at the other end thereof,
    a magnetic hollow tubular core axially mounted within said bore for dividing said bore into an annular outer chamber, a first inner chamber and a second inner chamber communicating with said inlet port, first outlet port and second outlet port, respectively, said core having first and second aperture means for fluid communication between said outer chamber and first and second inner chambers, respectively,
    a non-magnetic bobbin, having valve means and at least two radially outwardly extending and circumferentially spaced projections, slidably mounted on an outer periphery of said core to control the effective open areas of said first and second aperture means, said projections defining a first series of fluid passages therebetween for decreasing the dynamic fluid pressure axially acting thereon,
    spring means seated at one end thereof against said projections of said bobbin for biasing said bobbin to a position wherein said valve means closes said first aperture means and opens said second aperture means,
    a solenoid coil wound on said bobbin,
    permanent magnetic means secured in said body so that the magnetic flux thereof intersects the winding of said solenoid coil at right angles thereto, and
    electromagnetic means defining a magnetic circuit with said core and said permanent magnetic means to provide a magnetic force causing said bobbin to move axially against said spring means when electric current passes through said solenoid coil, said electromagnetic means including a magnetic yoke, and an annular member for supporting said yoke at one end thereof in said body, said annular member having radially outwardly extending and circumferentially spaced projections defining a second series of fluid passages for guiding the flow of fluid from said inlet port into said first series of passages between said projections of said bobbin.

4. A solenoid actuated valve device as set forth in claim 3, wherein said first series of passages includes a plurality of individual openings and said second series of passages includes a plurality of corresponding openings each axially aligned with one of said individual openings.

* * * * *